Patented July 16, 1940

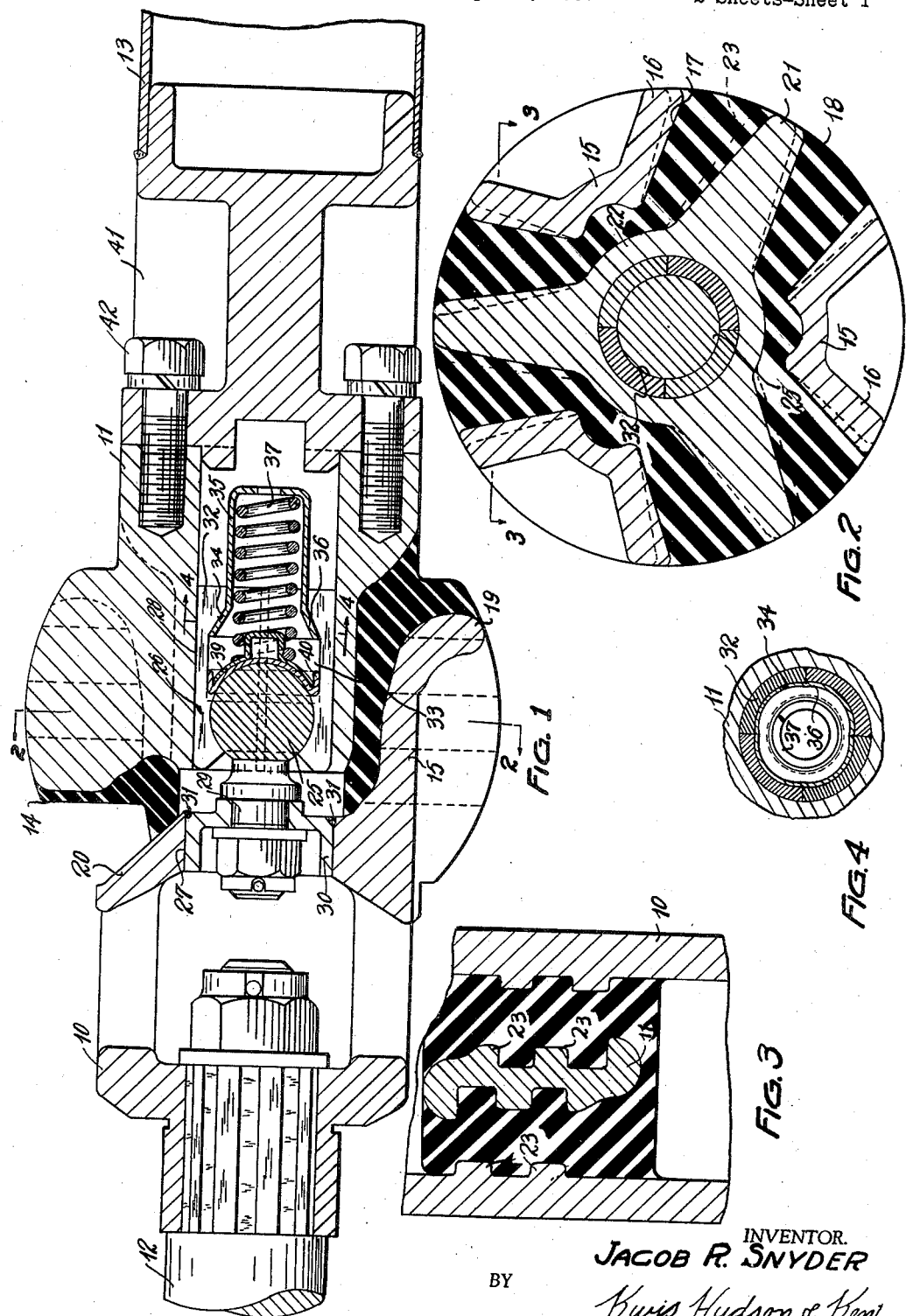

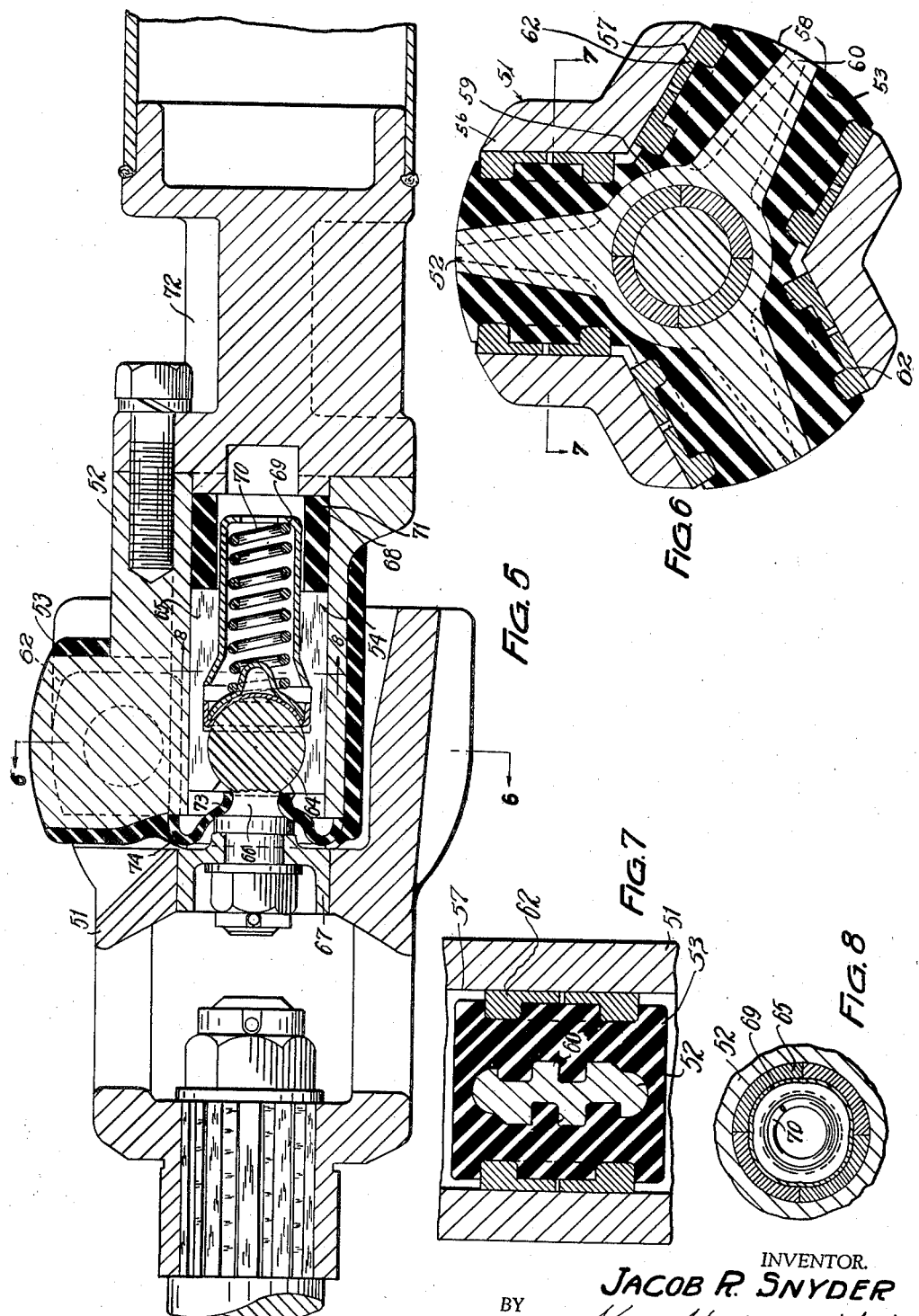

2,208,314

UNITED STATES PATENT OFFICE 2,208,314

UNIVERSAL JOINT

Jacob R. Snyder, Detroit, Mich.

Application September 4, 1937, Serial No. 162,507

7 Claims. (Cl. 64—14)

This invention relates to flexible coupling devices for torque transmitting shafts or members and more particularly to an improved form of universal joint.

An object of my invention is to provide an improved flexible coupling device having cooperating joint members so formed that rubber disposed between such members is adapted to form a flexible connection therebetween.

Another object of my invention is to provide an improved universal joint, of this type, in which one of the joint members has axial projections spaced circumferentially to form radially opening slots, and the other joint member has projecting vanes extending into such slots and embedded in rubber contained therein.

Still another object of my invention is to provide an improved flexible coupling or universal joint having interengaging joint members flexibly connected by rubber disposed therebetween and in which a device extends between the members substantially coaxially thereof, for centering the same with respect to the rotation axis.

A further object of my invention is to provide an improved flexible coupling device, of the type referred to, in which the rubber is bonded to one of the joint members and has bearing portions slidably engaging the other joint member.

Yet another object of my invention is to provide a universal joint having flexibly connected joint members and in which a novel centering means for such joint members is capable of quiet and efficient operation and does not require lubrication or adjustment.

Other objects and advantages of my invention will be apparent from the following description when taken in conjunction with the accompanying sheets of drawings, in which:

Fig. 1 is a longitudinal sectional view taken through a universal joint embodying my invention;

Fig. 2 is a transverse sectional view taken through the device, as indicated by line 2—2 of Fig. 1;

Fig. 3 is a partial sectional view taken on line 3—3 of Fig. 2;

Fig. 4 is a partial transverse sectional view taken through the centering device, as indicated by line 4—4 of Fig. 1;

Fig. 5 is a longitudinal sectional view similar to that of Fig. 1, but taken through another universal joint embodying my invention;

Fig. 6 is a transverse sectional view of the device taken on line 6—6 of Fig. 5;

Fig. 7 is a partial sectional view taken on line 7—7 of Fig. 6; and

Fig. 8 is a partial transverse sectional view taken through the centering device, as indicated by line 8—8 of Fig. 5.

For a more detailed description of my invention, reference will now be made to the accompanying drawings, in which I show two embodiments of my invention. Before proceeding with such detailed description, it should be understood, however, that the drawings are to be regarded as being mainly illustrative and that the invention may be embodied in various other flexible coupling devices and universal joints.

In the embodiment of my invention illustrated in Figs. 1 to 4, inclusive, I show a universal joint comprising a pair of coaxially disposed, flexibly connected, torque transmitting joint members 10 and 11. When my improved coupling device is to be used as a universal joint, as illustrated in this instance, the joint member 10 may be connected with a splined driving shaft or member 12, such as the splined shaft of an automobile transmission and the joint member 11 may be connected with a shaft or member to be driven, such as the torque tube 13.

To connect the joint members 10 and 11 for the transmission of torque and for angular tilting of one member relative to the other, I provide flexible connecting means between the joint members in the form of resilient or yieldable vulcanized rubber 14 of suitable composition. The rubber is bonded to the joint members and forms a permanent connection therebetween, which is capable of yielding to absorb shocks or vibrations in the torque being transmitted and to permit angularity or relative tilting between the joint members.

I construct the joint members 10 and 11 so that the adjacent or connected ends thereof have interengaging or interfitting projections between which the yieldable rubber extends. The joint member 10 may be formed with circumferentially spaced axially extending projections 15, preferably three in number as here illustrated, although any desired number may be provided. Each of these projections has diverging or oppositely inclined ribs or flanges 16 which are so disposed that the correspondingly inclined adjacent faces 17 of a pair of the projections define a radially opening, axially extending slot 18. At their outer ends, the projections 15 may have rounded portions 19, which curve outwardly to avoid interference with the joint member 11 during angularity, and, at their inner ends, may be integrally connected with the body of the joint member 10. The connection of these projections with the body of the joint member 10 may be such as to provide the corresponding end of the slot 18 with an end wall 20, which is also inclined in a direction to avoid interference with the joint member 11 during angularity of the device.

The joint member 11 may be constructed with projecting vanes 21, which correspond in number with the axial projections of the joint member 10 and which project outwardly into the slots 18.

These vanes may be formed as integral projections of the hub-like portion 22 of the joint member 11 and may extend for a substantial distance along this hub member, in the direction of the axis of the device.

The rubber 14 which forms the yieldable connection between the joint members 10 and 11 may comprise a body or bodies of rubber which substantially fills the slots 18 and in which the vanes 21 are embedded. The rubber is bonded to the surfaces of the joint members and forms a permanent connection between these members. To strengthen the connection between the rubber and the metal, I may provide the faces of the vanes 21 and the faces 17 of the projections 15 with grooves or surface irregularities 23, into which the rubber extends and which provide an increased area of contact between the rubber and the metal.

For centering the joint members 10 and 11, with respect to the rotation axis, I provide a centering device comprising a ball 25 and a socket or bearing 26 therefore. To accommodate this centering device, the joint members 10 and 11 may be provided centrally thereof with aligned axially extending openings or recesses 27 and 28. The ball 25 may be provided with a stem portion 29, and may be mounted on the joint member 10 by having this stem portion connected with a bushing 30 which is retained in the opening 27 by a press fit or by welding 31, or both. The bearing 26 forms a socket for the ball 25 and is slidable in the recess 28 of the joint member 11. This bearing is formed of a bearing material having self-lubricating characteristics, preferably a non-metallic substance.

The bearing 26 is preferably composed of a set of axially extending segments 32 which are formed to provide a pocket or chamber 33 inwardly of the ball 25 and with angularly inclined faces 34 forming an end wall of this pocket. Forming the bearing 26 of segments facilitates the assembling of the bearing on the ball 25 and also provides for an expanding or shifting of the segments for taking up wear or looseness which may develop in the centering device.

For causing such expansion or shifting of the segments, I provide an expander in the form of a tubular metal member 35, which is carried by the bearing and which has a flared or frusto-conical skirt portion 36 engageable with inclined faces 34. A coil spring 37, contained in the expander 35 and bearing against the ball 25, urges the expander axially away from the ball, thereby tending to cause one end of the bearing 26 to expand in the recess 28 and the other end to contract around and hug the ball. The spring 37 preferably does not bear directly on the ball 25, but engages a curved plate 39 which fits against the ball with a layer or segment 40 of bearing material interposed therebetween. The material of this bearing may be similar to that which forms the segments 32 of the bearing 26.

To enable the expander 35 to maintain the bearing segments 32 in proper adjustment, even though considerable wear may have taken place, I preferably construct the skirt portion 36 with lobe-like sections, as indicated in Fig. 4, rather than as a true frusto-conical section. The inclined faces 34 of the segments have a similar contour, that is, are defined by arcs struck from centers which are offset substantially radially outwardly from the longitudinal axis of the bearing.

For purposes of assembling my universal joint, it may be desirable to construct the joint member 11 with the recess 28 extending therethrough and with an extension part 41 interposed between this member and the torque tube 13. This extension member may be connected with the joint member 11 by the screws 42 and forms a tight cover or closure for the recess 28.

From the foregoing description of my improved universal joint, it will be seen that the rubber 10 forms a permanent yieldable connection between the interfitting joint members, capable of absorbing shocks or vibrations in the torque and also capable of permitting angularity between the joint members. The rubber also forms a closure or seal around the centering device which effectively excludes water and dust from this device. It will also be seen that the centering device itself embodies novel bearing means, which is self adjustable for taking up wear or looseness therein, and, because of the self-lubricating characteristics of the bearing material, does not require additional lubrication at any time during the life of the joint.

In Figs. 5 to 8, inclusive, I have shown a flexible coupling device or universal joint which is generally similar to that of Figs. 1 and 2, in that it has interengaging joint members 51 and 52 which are flexibly connected by means of interposed rubber 53 and a centering device 54, but in which the rubber is bonded to only one of the joint members and has bearing portions slidable relative to the other joint member. The joint member 51 may be formed with axially extending projections 56, which may be of flanged or fluted form, and each of which has a pair of relatively inclined substantially flat bearing faces 57. These projections are spaced circumferentially so that the adjacent faces 57 of each pair of projections are in substantially parallel relation to each other and define a radially opening slot 58. The joint member 52 may be formed with an axially extending central or hub portion 59, and with circumferentially spaced vanes 60 which project outwardly from the hub portion into the slots 58 and are embedded in the rubber 53. The rubber is preferably bonded to the joint member 52 and, to increase the strength of the connection between the rubber and metal, the faces of the vanes 60 may be provided with grooves or recesses 61 to increase the bonding area.

The rubber 53 is not bonded to the joint member 51, but has sliding engagement with the faces 57 of the axial projections 56. To reduce the friction between the rubber and the faces 57, I provide the rubber with bearing portions, preferably in the form of inserts 62 which may be interlocked with the rubber and are formed of a suitable material having self-lubricating characteristics.

The rubber 53 forms a yieldable connection between the joint members 51 and 52, which will absorb shocks and vibrations during the transmission of torque and will permit angularity of the joint members by relative sliding between the bearing portions 62 and the faces 57. The rubber is preferably placed under initial compression at assembly of the device and is maintained in a state of compression between the pairs of faces 57 of the joint member 51.

The joint members 51 and 52 are centered with respect to the rotation axis by means of the centering device 54, which comprises a ball 64 and a segmental bearing or socket 65 for the ball. The ball 64 may be carried by a reduced neck or stem 66 which is mounted in a bushing 67 of the joint member 51. The segmental bearing 65 may be mounted for axial sliding in a recess 68 of the joint member 52. An expander 69 acting on the segments under the influence of a spring 70, causes looseness or wear to be automatically taken up and holds the segments in close engagement with the ball and with the wall of the recess 68. For cushioning the inward axial movement of the bearing 65, I may provide a sleeve or bushing 71 of soft rubber, which is disposed in the recess 68 and may have an opening into which the expander 69 extends.

The bearing 65 is formed of a material having self-lubricating characteristics and hence the centering device may be completely sealed within the universal joint so as to exclude water and dust. The sealing means for the centering device may include the extension part 72, which forms a closure for one end of the recess 68 of the joint member 52, and a bushing or collar 73 of rubber or other suitable material which surrounds the neck 66 of the ball 64 and has an outwardly extending flange portion 74 bearing against or connected with the rubber 53.

It will be seen from Figs. 2 and 6 that in both forms of the universal joints herein disclosed the outer or hollow joint member has radiating recesses extending outwardly with respect to the axis of the joint member and which are connected with each other at their inner ends. The single body of yieldable rubber located in the hollow joint member has portions thereof extending outwardly into these radiating recesses so as to surround the corresponding radiating arm portions of the inner joint member which project into such recesses. As explained above, this body of rubber is bonded to the inner joint member and provides a yieldable connection between the two joint members. In the form of the invention shown in Fig. 6 the bearing means 62 interlocked with the body of rubber has slidable engagement with the faces of the radiating recesses.

It will now be readily understood that my improved flexible connection or universal joint is a device of simple and compact form, which can be economically manufactured and which, during use, will not require adjustment or lubrication. It will be seen, furthermore, that this device has no large or unbalanced masses of metal which would tend to cause objectionable vibrations. Furthermore, the self adjusting characteristics of the centering device eliminates servicing problems and insures smooth and quiet operation.

In both forms of universal joints herein disclosed the interposed yieldable rubber will permit limited relative axial shifting between the joint members and I consider this to be an advantageous characteristic because it eliminates the need for a splined slip joint in the propeller shafts, or other torque transmitting shafts, in which my joints may be used.

While I have illustrated and described my improved universal joint in a somewhat detailed manner, it will be understood, of course, that I do not wish to be limited to the precise details of construction and arrangements of parts herein disclosed, but regard my invention as including such changes and modifications as do not constitute a departure from the spirit of the invention and scope of the appended claims.

Having thus described my invention, I claim:

1. A device of the character described comprising a pair of torque transmitting members, one having circumferentially spaced axial projections thereon and the other having vanes extending outwardly between the projections, and rubber disposed between said projections and vanes and providing a cushioning and flexing medium therebetween, said rubber being bonded to one of the members and slidable relative to the other member.

2. A device of the character described comprising a pair of torque transmitting members, one having circumferentially spaced axial projections thereon and the other having vanes extending outwardly between the projections, rubber disposed between said projections and vanes and providing a cushioning and flexing medium therebetween, and a device extending between the members substantially coaxially thereof for centering the same with respect to the rotation axis, said rubber being bonded to one of the members and slidable relative to the other member.

3. In a device of the character described the combination of a joint member having axial projections circumferentially spaced to provide substantially radially extending openings therebetween, bodies of rubber under initial compression in said openings and having bearing portions slidably engaging the sides of the openings, and a second joint member having projecting vanes embedded in said bodies of rubber.

4. In a device of the character described the combination of a joint member having axial projections circumferentially spaced to provide substantially radially extending openings therebetween, bodies of rubber under initial compression in said openings and having bearing portions slidably engaging the sides of the openings, and a second joint member having projecting vanes embedded in said bodies of rubber, said bearing portions being inserts formed of material having self-lubricating characteristics.

5. In a structure of the character described, a pair of joint members, yieldable rubber disposed therebetween and bonded to one of the members, and bearing means interlocked with the rubber and having sliding engagement with the other joint member.

6. In a joint of the character described, a joint member having a series of circumferentially spaced elements, a second joint member having a series of circumferentially spaced elements extending into the spaces between the elements of the first mentioned series, yieldable rubber disposed between said elements and bonded to the elements of one series, and bearing means interlocked with the rubber and having sliding engagement with the elements of the other series.

7. In a joint of the character described, a hollow joint member having a series of recesses radiating outwardly with respect to the axis of the member and connected with each other at their inner ends, a second joint member extending into said hollow joint member and having radiating arms projecting outwardly into said recesses, a single body of yieldable rubber disposed in the hollow joint member with portions thereof extending outwardly into said radiating recesses so as to surround said radiating arms, said rubber providing a yieldable connection between the joint members and being bonded to the second joint member, and bearing means interlocked with the rubber and having sliding engagement with the walls of said radiating recesses.

JACOB R. SNYDER.